S. M. DECKER.
BATTERY CONNECTOR.
APPLICATION FILED APR. 21, 1916.
1,215,004.    Patented Feb. 6, 1917.
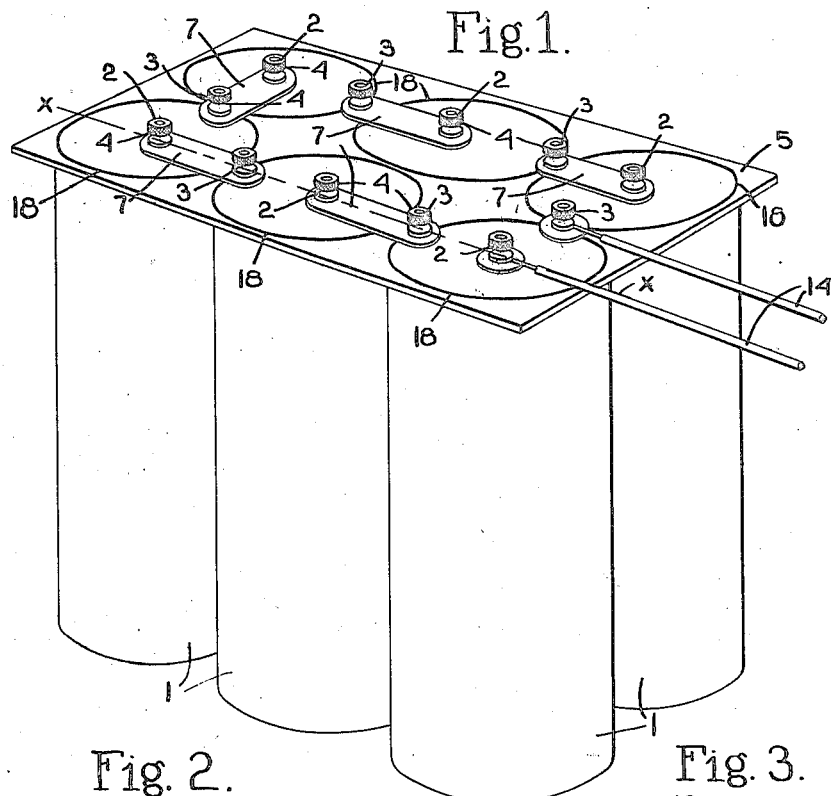
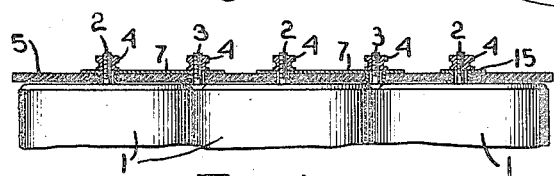
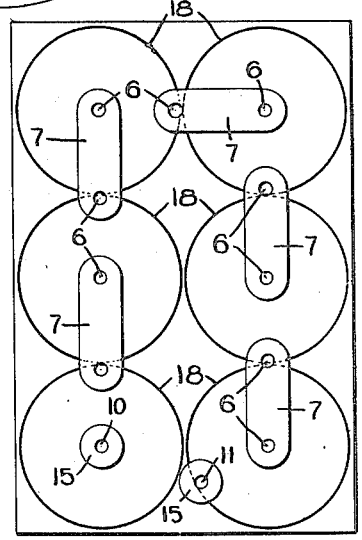
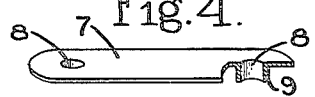
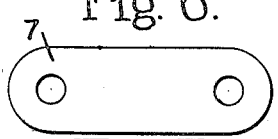
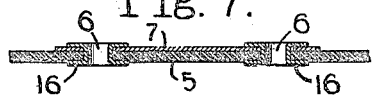
Inventor.
Spencer M. Decker
by Attys.

UNITED STATES PATENT OFFICE.

SPENCER M. DECKER, OF MALDEN, MASSACHUSETTS, ASSIGNOR OF ONE-FOURTH TO CHARLES L. RIDGWAY, OF BOSTON, MASSACHUSETTS.

BATTERY-CONNECTOR.

1,215,004.

Specification of Letters Patent.

Patented Feb. 6, 1917.

Application filed April 21, 1916. Serial No. 92,749.

*To all whom it may concern:*

Be it known that I, SPENCER M. DECKER, a citizen of the United States, residing at Malden, county of Middlesex, State of Massachusetts, have invented an Improvement in Battery-Connectors, of which the following description, in connection with the accompanying drawing, is a specification, like characters on the drawing representing like parts.

This invention relates to battery connectors and has for its object to provide a novel device by which a plurality of dry cells may be connected together and held in proper position relative to each other and by which the necessary electrical connection between the successive cells is made. My battery connector, therefore, not only holds the cells in proper position, but also electrically connects them in series.

In order to give an understanding of my invention, I have illustrated in the drawings a selected embodiment thereof which will now be described, after which the novel features will be pointed out in the appended claim.

Figure 1 is a perspective view of a battery of dry cells connected by means of my improved connector;

Fig. 2 is a vertical section on the line x—x, Fig. 1, the cells being shown in side elevation;

Fig. 3 is a view of the connector plate removed;

Fig. 4 is a view of one of the connector members before it is applied to the plate.

Fig. 5 is a sectional view showing a connector member fastened to the plate;

Fig. 6 shows a modified form of connector member;

Fig. 7 is a view similar to Fig. 5 showing the connector member of Fig. 6 fastened to the plate.

I have shown at 1 a plurality of battery cells such as are commonly used for various purposes. These cells may have any suitable or usual construction and each is shown as provided with two terminals or binding posts 2 and 3, each of which has a nut 4 thereon. When a battery of dry cells is used it is the common practice to connect the various cells in series by means of short lengths of wires. This construction is not always satisfactory because in the first place the wires constitute a flexible connection between the cells and do not firmly hold the cells in position relative to each other so that it is difficult to handle the battery unless the cells are placed in a battery box. Then again, the wire connections between the various cells often become broken or the wires become pulled off from the cell terminals, thus breaking the connection and rendering the battery useless until the connection is prepared. In order to avoid these difficulties, I have provided a battery connector in the form of a plate 5 of insulating material which is adapted to overlie the upper ends of the cells 1 and which is provided with apertures 6 through which the terminals 2 and 3 of the cells project. The plate has also secured thereto connecting members 7 so arranged as to connect electrically the aperture 6 through which one terminal of each cell projects to the aperture through which the terminal of opposite polarity of another cell projects, so that when the plate is in position and the nuts 4 are all clamped tight on the binding posts, the cells will be electrically connected in series through the connecting member 7.

The plate 5 may have any suitable shape, depending upon the number of cells in the battery and their relative position. In the embodiment of the invention shown the battery contains six cells arranged in two rows of three and the plate is, therefore, a rectangular plate. The connecting members 7 will preferably be arranged on the upper side of the plate 5, as shown in the drawings, and I will also preferably make each of the apertures 6 a metal-lined aperture so as to provide for a better electrical connection between the cells. One convenient form for the connecting member 7 is that shown in Fig. 4 in which the connecting member is in the form of a metal strap having an aperture 8 formed near each end thereof. This aperture is made by punching out metal in such a way that the metal which is removed to provide the aperture is bent into the form of a downturned flange 9 encircling the aperture. In applying this connecting member to the plate 5, said connecting member is placed in position on the plate and the flanges 9 are inserted through the apertures 6 of the plate and thereafter said flanges are spun over, as shown at 21 in Fig. 5, thereby to permanently secure the connecting member to the plate. This construction not only provides a simple means for permanently securing the connecting member to the plate, but it also results in a metal-lined aperture 6 through which the terminals 2 and 3 of the cells extend. These connecting members 7 are so arranged on the plate 5 that each member connects an aperture through which a terminal 2 of one cell extends with an aperture through which projects the terminal 3 of the next adjacent cell, and, therefore, when the nuts 4 are screwed down tight onto the terminals, the cells will be all electrically connected with each other in series. Furthermore, the setting up of the nuts 4 clamps the cells firmly to the plate 5 so that the plate rigidly holds the cells in proper position relative to each other and makes a battery unit which can be easily transported or handled without danger of breaking any connection between the cells. The two apertures 10 and 11 through which extend the terminals of opposite polarity of the first and last cells of the series are not connected as these are the terminals to which the circuit wires 14 are secured. These apertures 10 and 11 will preferably be metal-lined which may be done by providing them with metal eyelets 15, the purpose of this construction being to insure a good electrical connection between the terminals and the circuit wires 14.

Instead of using a connecting member 7 having the flanges 9 formed thereon which flanges constitute the metal lining for the aperture and the means for securing the connecting member to the plate 5, I may make the connecting member with plain apertures, such as shown in Fig. 6, and then secure the connecting member to the plate by means of metal eyelets 16, as shown in Fig. 7. This construction I regard as the equivalent of that shown in Figs. 4 and 5.

My improved connector is so constructed that it is not necessary to use any extra bolts or screws for securing it to the cells or for establishing the electrical connection between the cells. Moreover, by means of the construction shown the apertures 6 through the plate 5 are not only metal lined, but are provided with metal surfaces on both sides of the plate so that a good electrical connection between each connector and each cell terminal is insured. The metal lining of the apertures is also advantageous because it prevents injury to the plate 5.

I will preferably mark the top surface of the plate 5 with circles 18 indicating the position of the cells beneath the plate so that when the battery is placed in the box in such a position that the cells themselves are not visible, any person can readily locate the position of the different cells by the circles 18.

Another advantage of my invention is that it makes it possible to take off taps of various voltages without disturbing the original string of cells. If, for instance, it was desirable to furnish to a circuit voltage of one-half that developed in the entire string of cells, the feed wires from the circuit would be connected to the alternate terminals so as to include three cells only and this may be done without disturbing in any way the connections between the other cells.

While I have illustrated herein a selected embodiment of my invention, I do not wish to be limited to the constructional features shown.

I claim:

In a battery connector, the combination with a plurality of cells, each having two terminals, of a plate or sheet of insulating material overlying said cells and having apertures through which the terminals of the cells project, and connector members of conducting material, each adapted to connect a terminal of one cell to a terminal of another cell, each connector member being in the form of a strap and having associated therewith circular flanges that extend through the terminal-receiving apertures, the edges of said flanges being spun over against the face of the sheet thereby securing the connector member to the sheet and providing metal-lined terminal-receiving apertures.

In testimony whereof, I have signed my name to this specification.

SPENCER M. DECKER.